J. BÜCHI.
DEVICE FOR SEPARATING SAND CARRIED IN WATERCOURSES.
APPLICATION FILED MAR. 26, 1921.
1,431,367.
Patented Oct. 10, 1922.
3 SHEETS—SHEET 1.
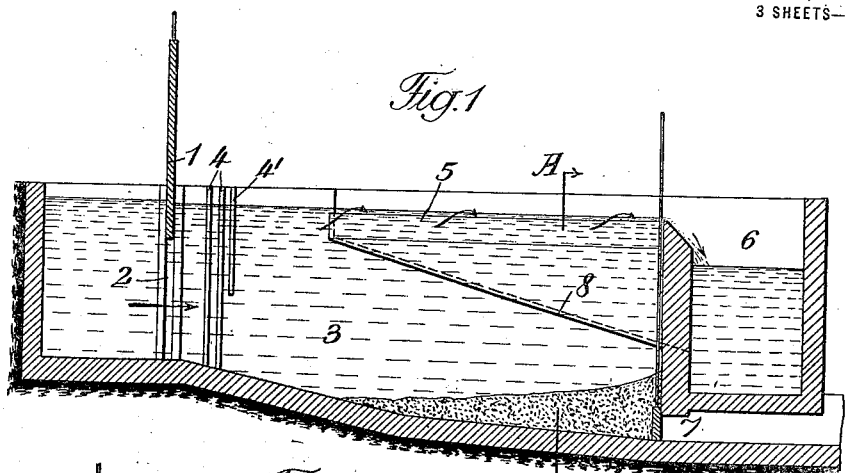
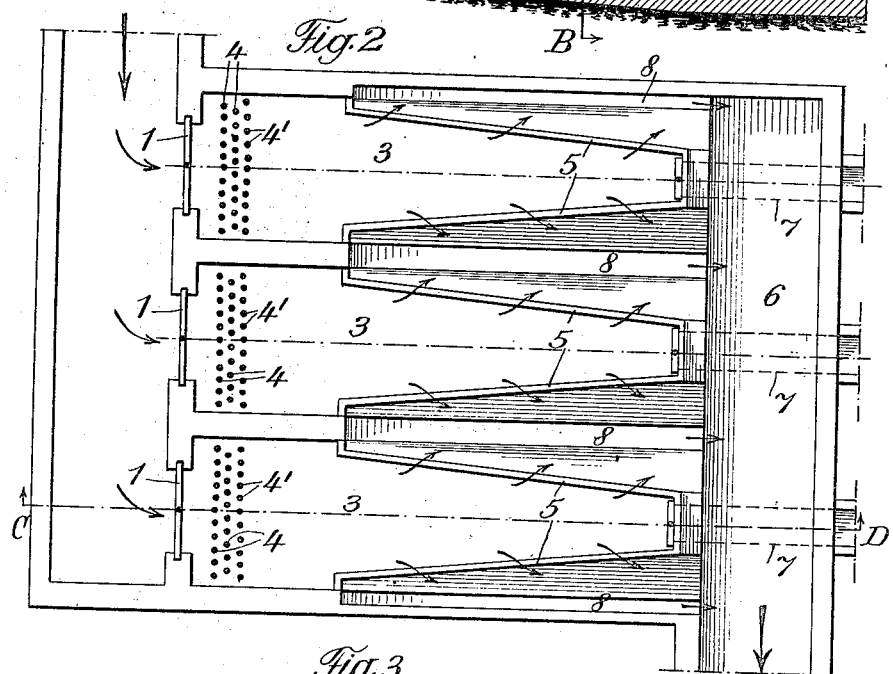
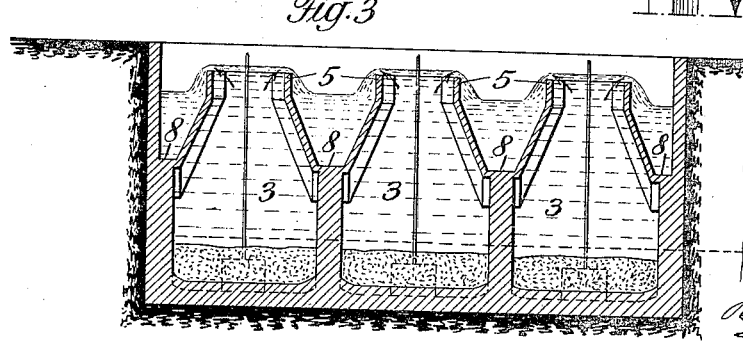
Inventor
Jakob Büchi
By
Atty.

Inventor:
Jakob Büchi

J. BÜCHI.
DEVICE FOR SEPARATING SAND CARRIED IN WATERCOURSES.
APPLICATION FILED MAR. 26, 1921.
1,431,367.
Patented Oct. 10, 1922.
3 SHEETS—SHEET 3.
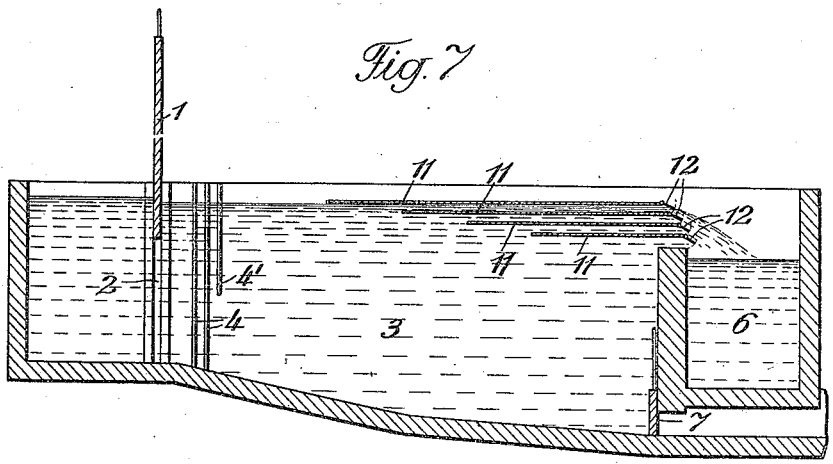
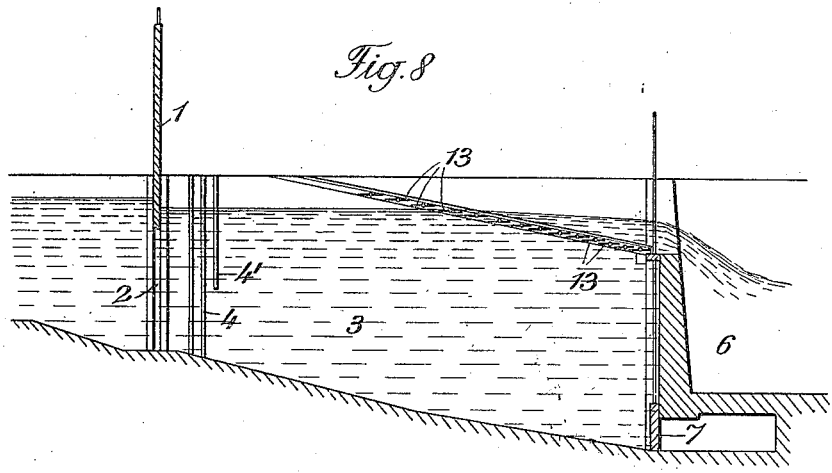
Inventor:
Jakob Büchi
By
Atty.

Patented Oct. 10, 1922.

1,431,367

UNITED STATES PATENT OFFICE.

JAKOB BÜCHI, OF ZURICH, SWITZERLAND.

DEVICE FOR SEPARATING SAND CARRIED IN WATERCOURSES.

Application filed March 26, 1921. Serial No. 456,044.

(GRANTED UNDER THE PROVISIONS OF THE ACT OF MARCH 3, 1921, 41 STAT. L., 1313.)

*To all whom it may concern:*

Be it known that I, JAKOB BÜCHI, a citizen of the Republic of Switzerland, residing at Zurich, Switzerland, have invented certain new and useful Improvements in a Device for Separating Sand Carried in Watercourses (for which applications have been filed in Switzerland November 3, 1915, Patent No. 72,795; in Germany November 9, 1915, Patent No. 298,758; in Austria November 18, 1916, Patent No. 80,712; in Spain December 19, 1917, Patent No. 66,068; in France May 8, 1919, Patent No. 499,168; in Italy May 7, 1919, Patent No. 142/500; in Portugal March 3, 1920, appln. No. 11,306); and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

The device according to the present invention serves to separate in a suitable manner sand or grit which is carried along by the running water, especially in conduits or channels for supplying water to water power stations.

The device comprises one or more chambers which are preferably of similar construction, the number of such chambers being dependent on the quantity of water to be treated and on local conditions. The essential features of such a chamber consists in a distributing device arranged at the inlet side causing the flow of the water to be uniform across the whole width of the cross-section of the chamber and a steadying of said flow at a speed at which the sand sinks gradually down to the floor of the chamber, whilst the thus cleaned water containing but little grit is drawn off by the discharge device towards the other (lower) end of the chamber. The said device extends from near the distributing device at the inlet end to the opposite end of the chamber, and acts in such a way that at first the uppermost layer of the water at a little distance from the distributing device is drawn off which drawn off water is separated in a strong current from the quiet flow within the chamber, so that the cross-section of the chamber is gradually relieved. Preferably the distributing device affects the flow of the water so that at the entering portion of the chamber the velocity of the water in the upper part of the chamber is smaller than the velocity in the part of the chamber nearer to the floor of the latter.

Several constructional examples of the invention are shown in the accompanying drawing, in which:

Fig. 1 is a longitudinal section through a first constructional example along line C—D of Fig. 2, Fig. 2 a plan view, Fig. 3 a vertical section along line A—B of Fig. 1;

Fig. 7 is a vertical section through a third constructional example and

Fig. 8 a similar section through a fourth constructional example.

Figure 4:
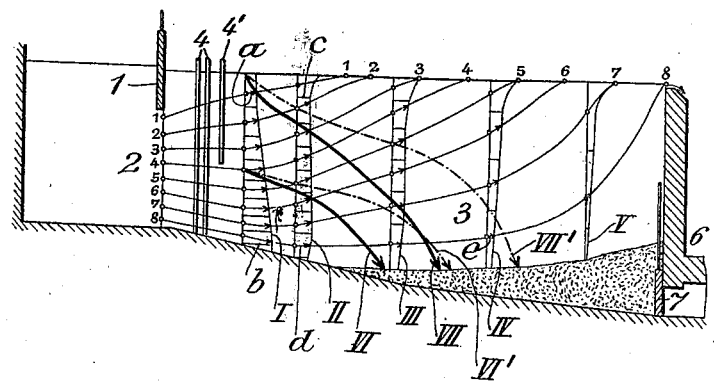
Fig. 4 shows in a diagrammatic manner the distribution of the velocities of the water in different vertical planes and the stream lines of the water in the chamber and the curves along which particles of sand move when sinking towards the floor.

Grit-containing water is supplied through the inlet opening 2, which can be regulated by a gate 1, into the oblong chamber 3. The water enters at a moderate speed from which as a rule the sand has not or has only in an insignificant extent settled down. Near the inlet opening and behind the latter a device 4 adapted to distribute and to quiet the flow of the water is provided. This device consists of three rows of vertically arranged pipes, of which the pipes 4' are not so much immersed as the other pipes. The suitable spacing of the pipes from each other and of the rows of pipes has to be chosen for every special case. It is evident that the distributing device may be constructed in many ways, for instance it may also be adapted to be regulated. To this end the pipes of each row of pipes may be connected together to form a grid-like structure. Each row of pipes may be independently raised and lowered by a rod or other suitable lifting device. The purpose of the distributing device is to cause a uniform distribution of the velocity of the incoming water across the whole width of the whole cross-section and to steady and quiet the flow and it enables partly by its own action or partly in connection with the inlet regulation to distribute the velocity in the vertical direction so that the velocity $b$ in the lower part is higher than the velocity $a$ in the part nearer to the level of the water (see curve I of Fig. 4) and that the velocity in the upper part does not exceed a given maximum limit, i. e., that velocity limit at which the grains of the sand to be separated start to sink down effectively. This velocity is small and is dependent on the size of the grains of the sand which have to be separated from the water. The uppermost layer of the water (layer 1 in Fig. 4) will have been wholly freed of sand or at least to the greatest part already at a short distance behind the distributing device in consequence of the sand sinking down. Now from this point it is started to draw off gradually the uppermost layers of water which are nearly free of grit in the direction of the flow by means of a discharge device and to relieve thereby the chamber. In the first example illustrated in Figs. 1, 2 and 3 this device for discharging the water is arranged in the shape of a weir 5 extending from the lower end of the chamber, i. e., the end that is opposite to the inlet end at both sides of the chamber to near the distributing device. The water freed of sand tumbles over the weir 5, and the effect of the greater velocity of the water passing over the edge of the weir 5 is indicated in Fig. 4 at the ends of the stream lines 1—1, 2—2, 3—3, 4—4, 5—5, 6—6, 7—7, 8—8. On the other side of the weir the clean water flows into a discharge channel which widens out and which is provided with an inclined floor 8, in which channel the water flows at a greater velocity through a comparatively narrow section to the clean water channel 6. It is evident that if the cross-section of the chamber 3 were constant the velocity of the water would become smaller towards the lower end of the chamber as the quantity of the water is decreased by the gradual drawing off of clean water. It is also evident, that the corresponding gradual decrease of this cross-section, as is shown in Figs. 1–3, ensures that the velocity of the water does not decrease much towards the end of each chamber 3 but is kept at a height, which is below the limit at which a sinking of the grains of sand occurs so that the latter is effectively caused to deposit on the floor of the chamber.

The curves I—V indicate the manner in which the velocities of the lower layers of the water (for instance 3—8) decrease gradually towards the lower end of the chamber, as a comparison of the distances $b$, $d$ and $e$ will show. A grain of sand situated in the stream-line 4—4 will thus sink only slowly in the beginning owing to the comparatively high velocity of the water, on its further movement the sinking motion will be increased owing to the gradual decrease of the velocity of the water and the grain will move along curves such as VI and VI′.

A grain of sand of a certain size which is situated in the water above the stream-line 1—1 will thus move along the curve VII when settling to the floor, and a grain of sand situated in the stream-line 4—4 will move along the curve VI. Grains of sand of smaller weights will sink along the curves VI′ and VII′.

By means of the arrangement shown in Figs. 1–3 the most economical use of the space of the chamber 3 is attained. At the lowest part of the sloping floor a closable opening 7 is arranged, through which the deposited sand can be flushed or sluiced to which end the inlet gate 1 is partly shut and the gate closing the opening 7 is fully opened. The opening 7 for flushing out the sand is preferably arranged, as is shown in the drawings, at the lower end of the chamber, it may, however, be arranged at any other part of the floor. The length of the chamber in the direction of flow must be such that sufficient length of way is provided for the sand or grit to permit of a complete settling down movement.

The weir may be composed of a number of single weirs, the edges of which may be arranged adjustably in the vertical direction in such a way, that more water can be drawn off at will either in the front part or in the rear part of the chamber 3 as shown in Figs. 5—8. When several chambers are made use of the edges of the weirs may be preferably arranged at different elevations corresponding to the conditions of the water level in the supply channel, so that all the chambers are supplied to the same degree.

Figure 5:
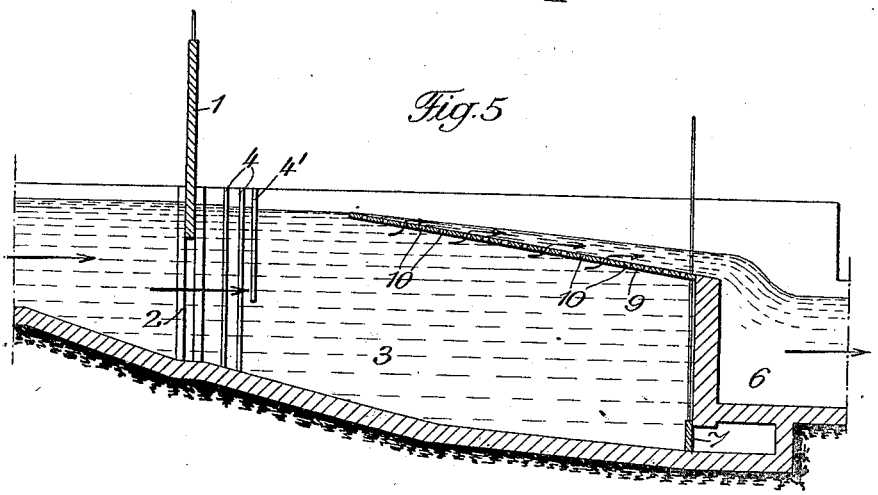
Fig. 5 is a vertical section through a second constructional example.
Figure 6:
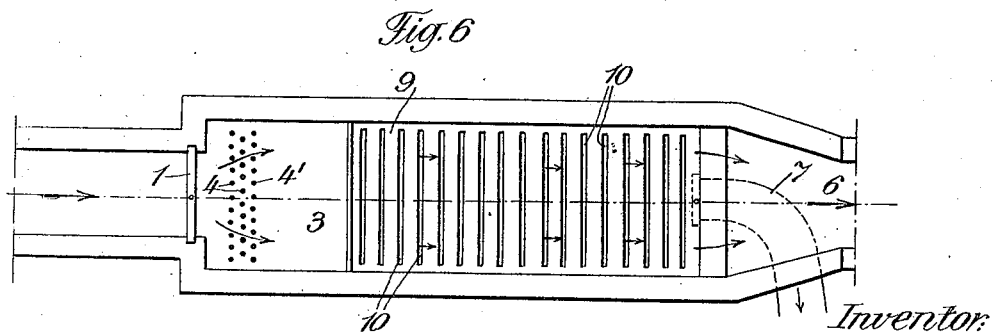
Fig. 6 is a plan view of Fig. 5.

In the constructional example illustrated in Figs. 5 and 6 the device for discharging the clean water is arranged as a simple inclined wall extending from one end of a chamber 3 of uniform width towards the distributing device 4 in an upwardly rising direction, and which wall is provided with a number of discharge openings 10 through which the clear water of the upper layers is discharged. The removal of the deposit of sand is carried out in the same manner as in the previously described example by means of a flushing opening 7.

In the constructional example illustrated in Fig. 7, several walls 11 which may be arranged horizontally or slightly inclined extending from the outlet end towards the inlet end, between which walls the water of the upper clean layers flows off. By means of flaps 12 arranged at the outlet ends between every two adjacent walls the discharge of the water may be regulated. By adjusting these flaps a uniform distribution of the water between the various walls may be attained or more water can at will be drawn off from the upper or the lower interstices whereby more water is drawn off either from the front part or the rear part of the chamber.

The device for discharging the water as illustrated in Fig. 8 consists of an inclined wall 13 provided with Venetian blinds; an adjustment of the different blinds ensures the discharge of the clean water from the upper layers to be effected more from the front part or more from the rear part of the chamber 3. In all the figures the crest over which the water discharges from chamber 3 into the clean water channel is lower than the level of the water coming into chamber 3.

I claim:

1. In a device for separating sand carried in water courses, a chamber having an ingress passage, means near said passage for checking the velocity of incoming water and uniformly distributing said velocity across the width of said chamber to permit settling of the sand, and speed increasing egress means for clarified water extending from near said checking means to the end of said chamber opposite its inlet for the upper clear layers of water.

2. A device for separating sand carried along with the water in water conduits, comprising at least one oblong settling chamber, a distributing device arranged near the inlet end to said chamber for causing a uniform distribution of the flow of the incoming water across the whole width of the cross-section of said chamber and a steady flow of said water at such a speed that the sand starts to settle down to the floor of the chamber, and a discharge device extending from close behind the distributing device to the other end of the oblong chamber for drawing off the upper clean layers of the water, gradually over the longitudinal extension of the chamber.

3. A device for separating sand carried along with the water in water conduits, comprising at least one oblong chamber a distributing device arranged near the inlet end to said chamber for causing a uniform distribution of the flow and a steadying of the incoming water across the whole width of the cross-section of said chamber so that the speed of the water in the top part of the chamber is smaller than in the part near the floor and keeping the speed below the limit at which the sand starts to settle to the floor of the chamber, and a discharge device extending from the other end of the oblong chamber to near to the distributing device for drawing off the upper clean layers of the water gradually over the longitudinal extension of the chamber.

4. A device for separating sand carried along with the water in water conduits, comprising at least one oblong settling chamber, a distributing device arranged near the inlet end to said chamber for causing a uniform distribution of the flow of the incoming water across the whole width of the cross-section of said chamber and a steady flow of the water at such a velocity that the sand starts to settle down to the floor of the chamber, means to regulate said device and a weir extending from the other end of the oblong chamber to close to the distributing device for drawing off the upper clean layers of the water gradually over the longitudinal extent of the chamber.

5. A device for separating sand from flowing water, comprising a long chamber, regulable water inlet means, means near said inlet to uniformly distribute the incoming water over said chamber, means to separate the upper clear layers of water, and a clear water channel having an overflow crest separating it from said chamber below the level of the water at the inlet.

6. A device for separating sand from flowing water, comprising a long chamber, regulable water inlet means at one end, means near said inlet to distribute the water over the width of said chamber, a clear water channel at the opposite end of said chamber and means to receive and guide the upper clear layers of water to said channel over a crest at a level below that of the water in said chamber.

7. A device for separating sand from flowing water, comprising a long chamber regulable water inlet means at one end, means near the inlet to distribute the water over the width of said chamber, a clear water channel extending across the opposite end of said chamber, means for separating the upper clear layers of water from those below and discharging them at increasing speed over a crest lower than the normal water level to the clear water channel, and means to permit the separate discharging of sand.

In testimony that I claim the foregoing as my invention, I have signed my name.

JAKOB BÜCHI.